United States Patent [19]

Kurtzahn et al.

[11] Patent Number: 5,551,602
[45] Date of Patent: Sep. 3, 1996

[54] APPARATUS FOR STORING AND DISPENSING HOT AND COLD BEVERAGES

[75] Inventors: Frithjof Kurtzahn, Weyhe-Leeste; Wolfgang Heilmann, Bremen, both of Germany

[73] Assignee: Kraft Jacobs Suchard, AG, Zurich, Switzerland

[21] Appl. No.: 301,377

[22] Filed: Sep. 6, 1994

[30]    Foreign Application Priority Data

Apr. 9, 1993 [DE] Germany ............... 43 30 005.7

[51] Int. Cl.$^6$ ................................................. B65D 35/56
[52] U.S. Cl. ..................... 222/105; 222/131; 222/481; 141/18
[58] Field of Search ....................... 222/129.1, 94, 222/95, 105, 181.1, 183, 131, 481, 325; 141/18, 21, 309, 10

[56]              References Cited

U.S. PATENT DOCUMENTS

| | | | |
|---|---|---|---|
| 2,147,622 | 2/1939 | McKenzie | 232/41 |
| 3,145,515 | 8/1964 | Clapsadle | 222/129.1 |
| 3,225,954 | 12/1965 | Herrick et al. | 222/95 |
| 3,587,934 | 6/1971 | Elmore | 222/181 |
| 3,976,277 | 8/1976 | Basel et al. | 251/7 |
| 4,153,182 | 5/1979 | Loeliger | 222/95 |
| 4,165,024 | 8/1979 | Oswalt et al. | 222/181 |
| 4,361,257 | 11/1982 | Stone, Jr. | 222/464 |
| 4,375,864 | 3/1983 | Savage | 222/81 |
| 4,450,987 | 5/1984 | Boettcher et al. | 222/641 |
| 4,506,812 | 3/1985 | DeFreitas | 222/536 |
| 4,662,521 | 5/1987 | Moretti | 206/484.2 |
| 4,785,974 | 11/1988 | Rudick et al. | 222/105 |
| 4,869,402 | 9/1989 | Ash, Jr. | 222/209 |
| 4,993,593 | 2/1991 | Fabiano et al. | 222/1 |
| 5,029,734 | 7/1991 | Nichols | 222/105 |
| 5,104,003 | 4/1992 | Stecoza | 222/83.5 |
| 5,115,943 | 5/1992 | Coleman | 222/94 |
| 5,118,009 | 6/1992 | Novitsky | 222/1 |
| 5,265,766 | 11/1993 | Kurtzahn et al. | 222/105 |

FOREIGN PATENT DOCUMENTS

| | | |
|---|---|---|
| 2055001 | 11/1991 | Canada . |
| 0440031 | 1/1991 | European Pat. Off. . |
| 2723392 | 11/1978 | Germany . |
| 2188305 | 9/1987 | United Kingdom . |

*Primary Examiner*—Andres Kashnikow
*Assistant Examiner*—Lisa Douglas
*Attorney, Agent, or Firm*—Thomas A. Marcoux; Thomas R. Savoie

[57]              ABSTRACT

An apparatus for storing and dispensing beverages comprising an outside casing including top and bottom sections, a flexible inner container inside the casing, and a dispensing tube for conducting a beverage from the inner container. The bottom section of the outside casing includes a base and forms an outlet region, and the top section of the outside casing is removably supported by and extends upward from the base and defines a casing interior. The base of the bottom section includes an upper outside circumferential edge, and the top section of the casing includes a lower lateral edge extending around the outside circumferential edge of the base in a contacting, sealing relationship therewith. The flexible inner container is disposed in the casing interior, is comprised of a thin, flexible and collapsible material, and defines a container interior for holding a beverage. The dispensing tube has an upper end in fluid communication with the container interior, and has a lower end in fluid communication with the outlet region to conduct the beverage from the inner container to said outlet region. The top section of the casing also includes a bell shaped insulating insert defining a hollow vacuum interior extending around the casing interior to thermally insulate the container interior.

9 Claims, 4 Drawing Sheets

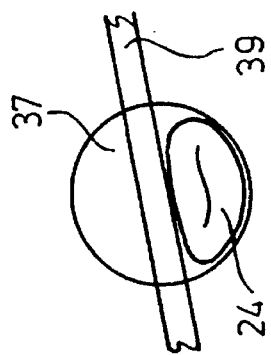
Fig. 6
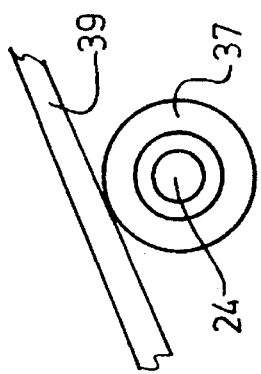
Fig. 7
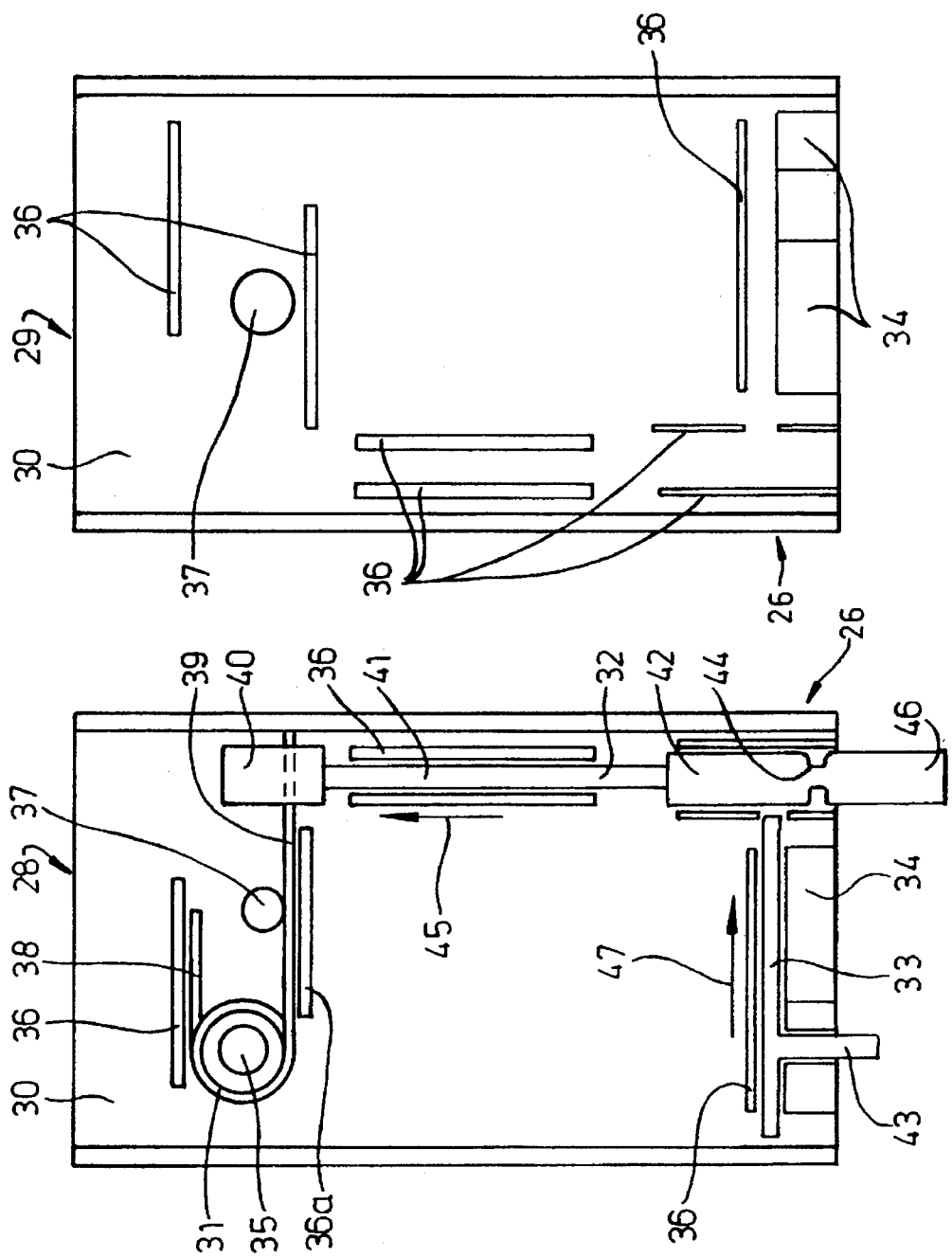
Fig. 5
Fig. 4

APPARATUS FOR STORING AND DISPENSING HOT AND COLD BEVERAGES

BACKGROUND OF THE INVENTION

The invention relates to an apparatus for storing and dispensing hot or cold beverages, especially coffee beverages, comprising an insulating container in which an exchangeable bag-like, gas-tight inner container, made of a thin, flexible and collapsible material for receiving the liquid is arranged, the inner container having a tube piece for filling and/or dispensing the liquid, which is passed to the outside of the insulating container.

Such insulating containers are quite suitable for storing hot beverages over a relatively long period, but it proved that aroma-sensitive beverages, especially coffee beverages suffer a loss of aroma after a short period. Coffee beverages lack the typical aroma of freshly brewed coffee.

For reducing aroma losses of such sensitive beverages it is known for example from DE-A-40 35 724 to arrange, within the insulating container, a bag-like, gas-tight inner container made from collapsible material which serves for receiving and dispensing the liquid and which is provided with a tube line for dispensing the corresponding tube line.

SUMMARY OF THE INVENTION

The invention is based on the object to improve an apparatus of the aforementioned kind regarding its insulating effect and handling.

To attain this object the apparatus according to the invention is characterised by the following features:

a) The insulating container is comprised of a bottom portion and a bell-shaped top portion, b) the bottom portion forms a base on which the top portion can be placed with a downwardly directed orifice, c) the base forms a circumferential edge which accommodates an edge region of the top portion such that the edge region has positive and sealing contact with the edge of the base, d) the inside of the top portion consists of a bell-like shaped insulating insert which is designed as a vacuum hollow body made from glass or the like.

The top portion has highly effective insulating properties and can be easily lifted off from the bottom portion so that the apparatus is extremely easy to handle.

It is particularly expedient if the insulating insert of the top portion is surrounded on the outside by thermally insulating plastic foam, for example polyurethane. The interaction of the vacuum in the insulating insert and the plastic foam results in an optimum thermal insulation. At the same time, the insulating insert made from glass is protected from damages by the plastic foam. A top portion designed in this manner is also further improved regarding its handling.

BRIEF DESCRIPTION OF THE DRAWINGS

Further features of the invention follow from the subclaims. An exemplary embodiment of the invention will be described below detail with reference to the drawings, in which:

FIGS. 4, 5 show a device for pinching a tube line for the apparatus according to FIGS. 1 to 3 in an unfolded state, FIGS. 6, 7 show a detail of FIG. 4 in different positions.

DETAILED DESCRIPTION OF THE PREFERRED EMBODIMENTS

Figure 1:
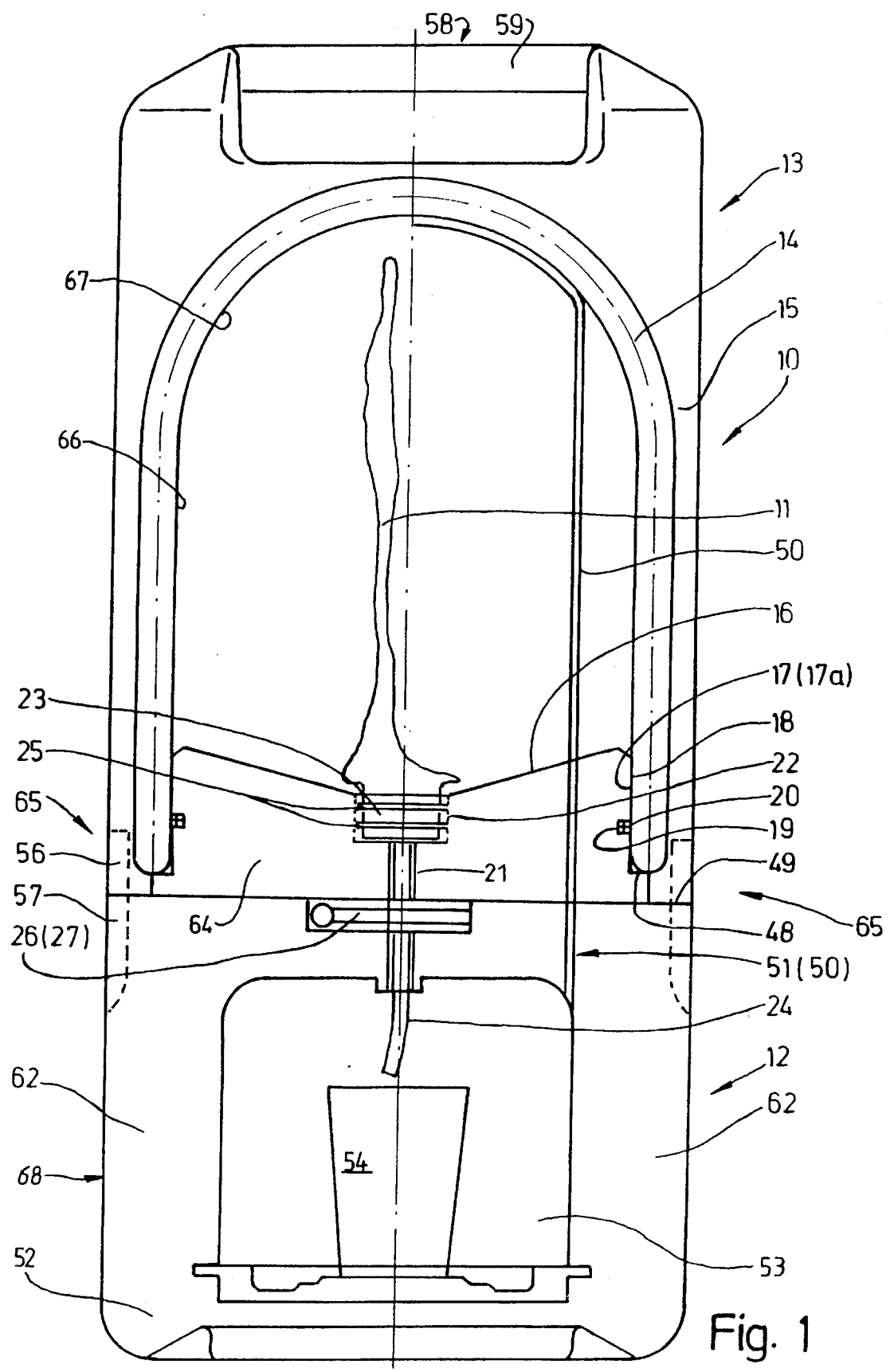
FIG. 1 shows a side view of the apparatus according to the invention.

The exemplary embodiment illustrated in the drawings relates to a container for storing and dispensing especially freshly brewed coffee beverages. Each container unit consists of an outer container, specifically an insulating container 10 and an inner container 11 arranged there in.

The insulating container 10 consists of a bottom portion 12 and a top portion 13. The top portion 13 can be lifted off the bottom portion 12. As a result, the inner container 11 is accessible for example for cleaning or exchanging the same.

The top portion is designed in a cap-like or bell-like manner. The inside of the top portion 13 is provided with a lower cylindrical portion 66, and an upper hemispherical portion 67, and opens towards the bottom. Furthermore, the top portion 13 is provided with an insulating insert. This insulating insert is formed from a material with particularly good insulating properties. Preferably, the insulating insert 14 is made from glass and is designed with double walls with an (almost) vacuum between the walls. Such inserts are known in principle from vacuum jugs.

The insulating insert 14 is surrounded by a stabilising surrounding, specifically an insulating layer 15. This insulating layer, in the first line, serves for protecting the insulating insert 14 from being damaged. Preferably, the insulating layer 15 is also made from insulating material, especially a plastic foam made from, for example, polyurethane. The insulating layer 15 gives the top part a round, square or rectangular cross-section.

The bottom portion 12 is provided with a base 64 which partially protrudes into the downwardly open top portion 13. The base 64, on its top side, is provided with a concave trough 16, and a circumferential edge 17 with an essentially vertically directed circumferential surface 17a. The cross-section of the top portion, on its inside (insulating insert 14), is dimensioned such that the trough 16 can be placed on the edge 17, thereby covering the same. In the shown embodiment, a lower edge portion 18 of the insulating insert 14, or of the cylindrical portion 66 of the same, almost sealingly contacts the circumferential edge 17. In order to support this, the edge 17 is provided with a sealing means which takes the form of a circumferential groove 19, and a sealing ring inserted therein. The latter prevents air from escaping from the inside of the insulating container 10.

At least the base 64, but preferably the entire bottom portion 12, is made from a material with good insulating properties. In the present case the bottom portion is designed as a one-piece shaped part. The bottom portion 12 is made from plastic foam, for example polyurethane, and is provided with a round, square or rectangular cross-section which corresponds to the top portion.

The liquid or the hot beverage is filled into the inner container 11 which consists of an air-tight and gas-tight and of course liquid-tight-film, especially a laminate with a metal layer. The inner container 11 is flexible an collapsible into a flat state when empty, such that the walls of the inner container 11 contact one another without trapping air (FIG. 1). When filled (not shown) the inner container is completely filled by the liquid, i.e. without any air being trapped. The same applies if the container is only partially filled, for example after a partial emptying of the inner container 11. Even then there is no air in the inner container 11.

Starting from the lowermost position of the concave trough 16, a bore, leadthrough or channel 21 is vertically arranged in the bottom portion. In its upper section—near the trough 16—the channel is provided with a larger cross-section in the form of a depression 22. The inner container 11 sits in the depression 22 with a connecting piece 23. A tube piece 24 which adjoins the connecting piece 23 is passed through the channel 21 and partly protrudes from the bottom of the channel. To compensate for tolerances and to ensure good thermal insulation, the connecting piece 23 does not contact the inner periphery of the depression 22. Rather, the connecting piece 23 has circumferential annular webs 25 which retain the piece the depression 22.

The tube piece 24 and the connecting piece 23 do not comprise any valve or closure means. Instead, a means 26 for pinching the tube line 24 is disposed in the bottom portion 12. The base 64 has an insert opening 27 on its front side which is located transversely relative to the channel 21 and which serves for receiving the means 26. The pinching means 26 takes the form of a cuboid slide-in unit and is shown in FIGS. 4, 5 with two halves 28, 29 unfolded. A base plate 30 which is preferably cast from a thermally insulating plastic material, is provided with projections 34, journals 35, and guide webs 36, in order to receive a spring 31, a piston rod 32 and a slide 33. The other half 29 has counterpart projections, journals and guide webs on a corresponding base plate 30. Both plates are provided with an orifice 37 each, and these orifices are aligned with the channel 21 when the pinching means 26 is located inside the bottom portion 12. Consequently, the tube piece 24 extends through the orifices 37.

The orifices are shown in detail in FIGS. 6, 7. The spring 31 sits on the journal 35. A shorter spring clip 38 bears on one of the guide webs 36, whereas a longer spring clip 39 extends about tangentially relative to the orifice 37, contacts a guide web 36a which is parallel to the aforementioned guide web 36, and is movable across the orifice 37 by the piston rod 32. For this purpose, the piston rod 32 is disposed transversely relative to the spring clip 39 and has a slotted head for receiving this spring clip 39, a rod-like centre part 41 adjoining the head, and a piston-shaped cylindrical end 42 adjoining the centre part. The slide 33 is disposed transversely relative to the piston rod 32. The slide 33 is mounted so as to be axially shiftable in its longitudinal direction via a grip part 43. The end 42 has a circumferential recess 44 in which the slide 33 can be locked.

FIG. 4 shows the members 31, 32, 33 in an initial position, for example after the inner container has been removed. To introduce the tube piece 24 into the channel 21, the piston rod 32 is moved axially, i.e. in the direction indicated by arrow 45. For this purpose, the end 42 projects beyond the base plate 30. As soon as the spring clip is in the position of FIG. 7, the slide 33 is moved into the recess (arrow 47), so that the piston rod 32 is locked in position. Now, the tube piece 24 can be passed through the channel 21 and also through the orifices 37 up to the exit of the bottom portion 12. To fill liquid into the inner container 11 the spring clip 39 remains in the position of FIG. 7. After the container has been filled, the slide 33 is moved back, thereby releasing the piston rod 32, and allowing the spring clip 39 to effectively pinch off the tube piece 24 (FIG. 6). To dispense a relatively small quantity of liquid, the longer spring clip 39 is temporarily pushed back by pressing the grip part 46. Accordingly, the liquid is dispensed by push of a button, so to speak. Alternatively, the slide 33 may be locked place, as described hereinabove, for a longer dispensation of liquid. Preferably, the two halves 28, 29, i.e. the two base plates 30 are connected to one another in a releasable manner, for example by means of screwed or snap-on connection (not shown).

It has become apparent that the embodiment described in the foregoing is particularly advantageous because of its minimum heat loss. The pinching means 26 is not assigned to the container 11, but it is integrated in the base 64 in the region of the lower half, that is to say in the lower third of the channel 21 and spaced apart from the inner container 11 and the depression 22. The distance between the pinching means 26 and the inner container 11 and, consequently, the thickness of the insulation between the two is such that the loss of heat via the pinching means 26 is reduced to a minimum. Accordingly, there are no significant thermal bridges which permit the escape of heat. The only thermal bridge is the channel 21 with the tube piece 24. However, this piece has only a small cross-section, so that the heat loss is negligible. The tube piece 24 is preferably formed from a flexible and thermally insulating material which does not adversely affect the flavour of the beverage.

A special design in the region of the transition from the top portion 13 to the bottom portion 12, i.e. the base 64 furthermore contributes to the thermal insulation. Below the sealing ring 20, the bottom portion 12 is designed with a step-like cross section, with a first step 48 (from the inside toward the outside), on which the insulating insert 14 rests, and with a second step 49, on which the rest of the top portion rests, especially with the insulating layer 15.

When filling the inner container 11, the air-volume which is present under the top portion 13 must be variable. For this purpose an aeration in the form of an air pipe 50 is provided. This air pipe 50 extends in the vertical direction along the edge of the trough 16, i.e. vertically through the same or the base 64, up to the highest point with in the top portion 13. Inside of the top portion 13, the air pipe 50 extends along the insulating insert 14. A tube made of rigid material may be provided as air pipe 50. The bottom portion 12 is provided with a corresponding bore 51 as a leadthrough for the airpipe 50. Since the air pipe extends up to the upper region of the top portion 13 no arm air can escape by thermal current.

Figure 2:
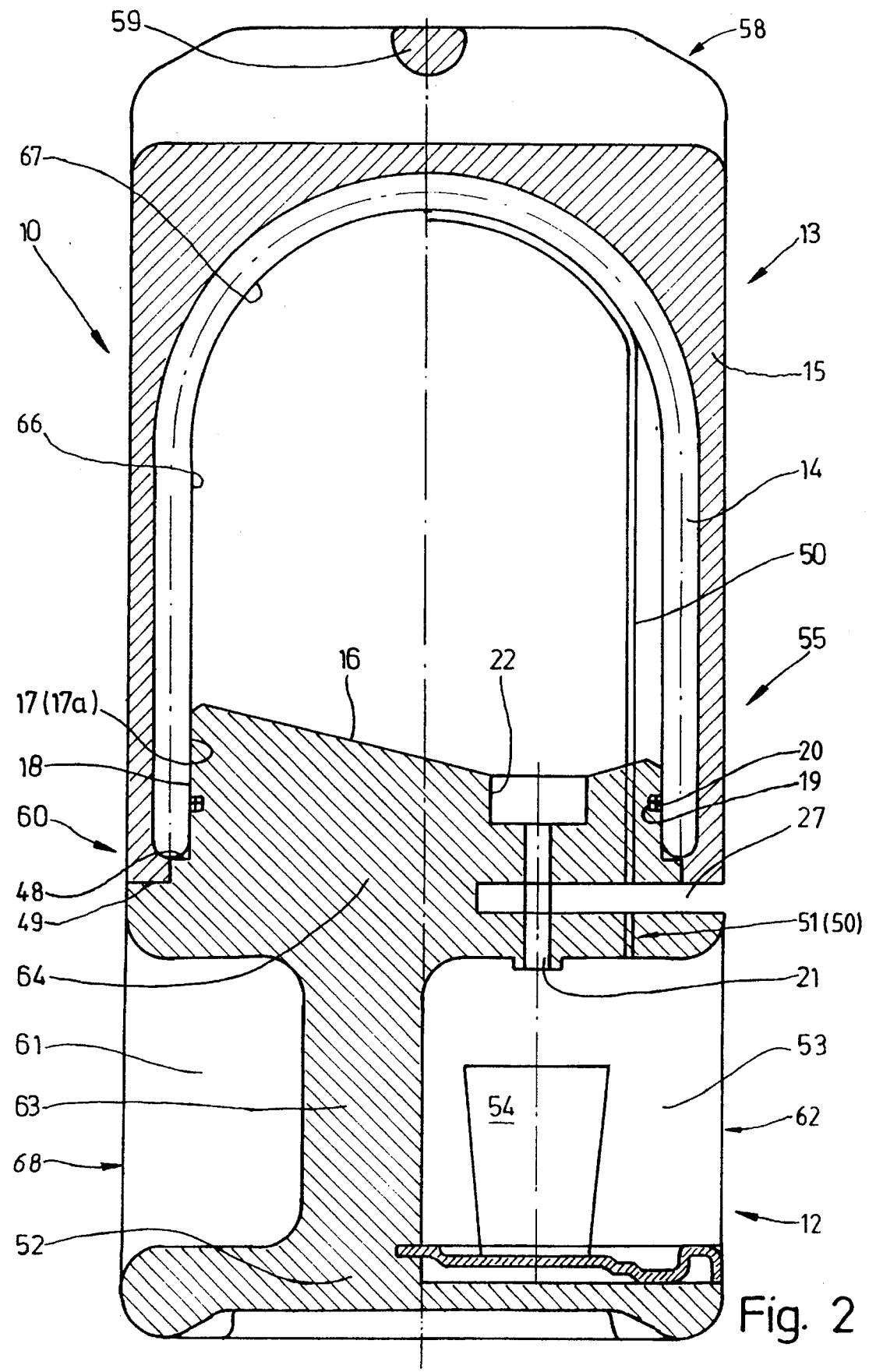
FIG. 2 shows a vertical section of the apparatus according to FIG. 1.

A bottom part 68 of the bottom portion 12 is provided with an integrated footing 52, and also has a relatively large lateral opening 53 into which a cup 54 or the like can be placed to be filled with the beverage. The channel 21 extends vertically into the opening 53, just as the bore 51. Because of the lateral arrangement of the opening 53, the lowermost point of the trough 16 and, thus, the depression 22 are disposed offset toward the front side 55 (opening 53) of the insulating container 10 (see FIG. 2). The air pipe 50, that is to say the bore 51 which is provided for this pipe, also extends into the opening 53 from above through the base 64 of the bottom portion 12, and is thus in a hidden position.

The inner container 11 can be filled via a simple plug connection between the tube piece 24 and a feed line (not shown) when the tube piece 24 projects from the channel 21 (FIG. 1).

Figure 3:
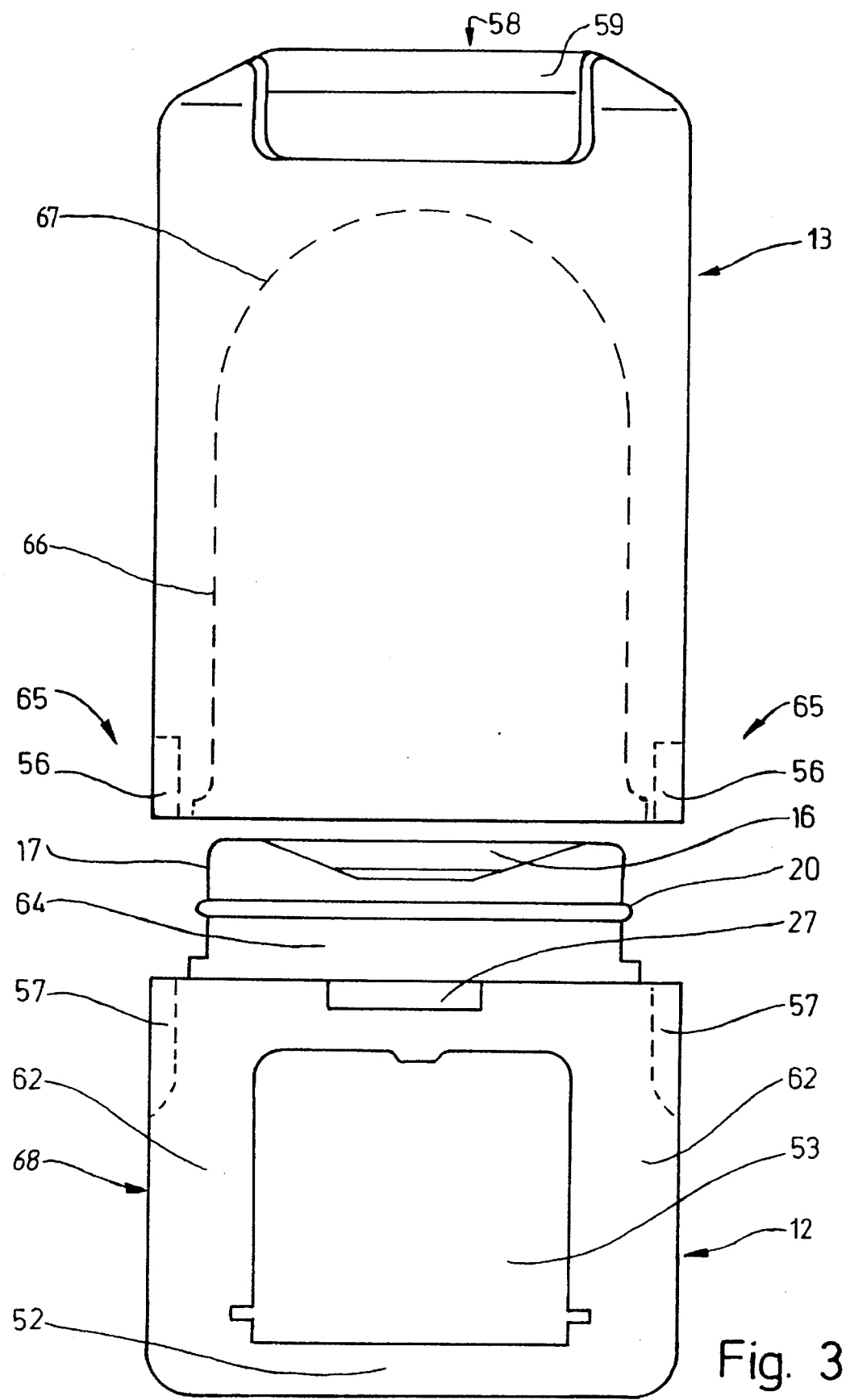
FIG. 3 shows the apparatus according to FIGS. 1, 2 taken apart in exploded view.

In FIG. 3, the bottom portion 12 and the top portion 13 are taken apart. Both parts can be locked to one another by appropriate closure means. Such closures are known in the art and do not have to be described in detail. They may, for example, be disposed in lateral indentations 56, 57 (side walls 65). The top portion 13 is provided with a handle 59 which is integrated into a top side. The entire insulating container 10 is thus extremely easy to transport and set up.

To reduce the weight of the apparatus, the bottom portion 12 is not only provided with the opening 53 in the region of the front side 55, but also with an opening or cavity 61 at the rear side 60. The base is altogether formed from a flat footing 52, lateral vertical side walls 62, a partition wall 63 disposed between the side walls 62 and the base 64 resting on the side walls and the partition wall. The top side of the base 64 forms the trough 16. The partition wall 63 and the side walls 62 define the openings 53 and 61.

We claim:

1. An apparatus for storing and dispensing beverages comprising:
    an outside casing including a top section and a bottom section, the bottom section including a base and forming an outlet region, the top section being removably supported by and extending upward from the base and defining a casing interior;
    a flexible inner container disposed in the casing interior, comprised of a thin, flexible and collapsible material, and defining a container interior for holding a beverage; and
    a dispensing tube having an upper end in fluid communication with the container interior, and having a lower end in fluid communication with the outlet region to conduct the beverage from the inner container to said outlet region;
    wherein the base includes an upper outside circumferential edge, and the top section includes a lower lateral edge extending around the outside circumferential edge of the base in a contacting, sealing relationship therewith; and
    wherein the top section further includes a bell shaped insulating insert defining a hollow vacuum interior extending around the casing interior to thermally insulate the container interior.

2. Apparatus as claimed in claim 1, wherein the insulating insert (14) the top section (13) immediately contacts the edge (17) of the base (64).

3. Apparatus as claimed in claim 1, wherein the insulating insert (14) of the top section (13) includes a lower cylindrical portion (66) and an upper hemispherical portion (67), the cylindrical portion (66) of the insulting insert having an inner cross section which corresponds to the circumferential edge (17) of the base (64).

4. Apparatus as claimed in claim 1, wherein the inner container (11) includes a connecting piece (23) for filling and emptying the inner container (11), and the base (64) forms a bottom surface (16) with a recess (22), into which the connecting piece (23) of the inner container can be inserted.

5. Apparatus as claimed in claim 4, wherein the recess (22) is followed by a channel (21) through which the dispensing tube (24) passes, the channel extending through base (64) and opening into the outlet region (53).

6. Apparatus as claimed in claim 1, wherein at least the base (64) is entirely formed from one shaped piece made from thermally insulating material.

7. Apparatus as claimed in claim 1, wherein the insulating insert (14) of the upper section (13) is surrounded, on the outside, by thermally insulating material which contacts the insulating insert (14) from the outside.

8. Apparatus as claimed in claim 1, further including an air pipe (50) for venting the container interior, the air pipe (50) extending through the base (64) in an upright direction, along the top section (13) to an upper region of the top section (13).

9. Apparatus as claimed in claim 1, wherein the base (64) includes a member (26) for pinching the dispensing tube to selectively open and close the dispensing tube.

* * * * *